(12) United States Patent
Brown, Jr. et al.

(10) Patent No.: US 11,280,079 B2
(45) Date of Patent: Mar. 22, 2022

(54) STRUCTURAL REINFORCED COMPOSITE CONSTRUCTION MAT

(71) Applicant: AXION STRUCTURAL INNOVATIONS, Zanesville, OH (US)

(72) Inventors: Claude Brown, Jr., Zanesville, OH (US); David C. Crane, Zanesville, OH (US); Robert E. Combs, Zanesville, OH (US)

(73) Assignee: Axion Structural Innovations, Zanesville, OH (US)

( * ) Notice: Subject to any disclaimer, the term of this patent is extended or adjusted under 35 U.S.C. 154(b) by 401 days.

(21) Appl. No.: 16/179,123

(22) Filed: Nov. 2, 2018

(65) Prior Publication Data

US 2019/0136503 A1 May 9, 2019

Related U.S. Application Data

(60) Provisional application No. 62/581,254, filed on Nov. 3, 2017.

(51) Int. Cl.
*E04B 1/24* (2006.01)
*E04B 5/02* (2006.01)
(Continued)

(52) U.S. Cl.
CPC ............... *E04B 1/2403* (2013.01); *B27D 1/10* (2013.01); *E01C 5/22* (2013.01); *E01C 9/08* (2013.01);
(Continued)

(58) Field of Classification Search
CPC ........... E04B 1/2403; E04B 2001/2406; E04B 2001/2415; E04B 2001/2457; E04B 5/026; B27D 1/10; E01C 5/22; E01C 9/08; E01C 9/086; E01C 5/00; E01C 11/24; E04C 2/40; E04C 3/29
(Continued)

(56) References Cited

U.S. PATENT DOCUMENTS

2,382,789 A * 8/1945 Guignon, Jr. ........... E01C 9/086
404/36
3,292,325 A * 12/1966 Nicolini .............. E04B 1/34315
52/223.7
(Continued)

*Primary Examiner* — Brent W Herring
(74) *Attorney, Agent, or Firm* — Robert L. Stearns; Dickinson Wright, PLLC (57) ABSTRACT

A structural reinforced composite construction mat includes a plurality of composite plastic beams that are ganged together to define the mat, with a plurality of flitch plates disposed between at least some of the plastic beams to provide additional strength and rigidity to the mat. The plastic beams may be made of a composite material have a generally rectangular cross-section. The flitch plates have a width (vertical height) when disposed between adjacent beams that is less than the width (vertical height) of the beams, such that the flitch plates may be recessed below and above the top and bottom surfaces of the mat, respectively. A plurality of rods extend in the lateral direction through the beams and plates to compress the beams and plates against each. The flitch plates may be metal or fiber-reinforced resin and may further include slotted holes to allow the beams to retract lengthwise in response to environmental changes.

23 Claims, 10 Drawing Sheets

(51) Int. Cl.
  *E04C 3/29* (2006.01)
  *E01C 5/22* (2006.01)
  *E04C 2/40* (2006.01)
  *E01C 9/08* (2006.01)
  *B27D 1/10* (2006.01)

(52) U.S. Cl.
  CPC .............. *E04B 5/026* (2013.01); *E04C 2/40* (2013.01); *E04C 3/29* (2013.01); *E04B 2001/2406* (2013.01); *E04B 2001/2415* (2013.01); *E04B 2001/2457* (2013.01)

(58) Field of Classification Search
  USPC .......... 52/309.2, 309.14, 309.16, 579, 799.1, 52/799.11, 800.1, 800.11, 800.12, 223.7; 404/35
  See application file for complete search history.

(56) References Cited

U.S. PATENT DOCUMENTS

| | | | | |
|---|---|---|---|---|
| 4,932,178 A * | 6/1990 | Mozingo | ................... | E01D 2/00 52/223.7 |
| 5,048,256 A * | 9/1991 | Thorsnes | ................ | E04C 3/292 52/847 |
| 5,603,134 A * | 2/1997 | Whipkey | .............. | E01D 15/133 14/2.4 |
| 6,007,271 A * | 12/1999 | Cole | ......................... | E01C 9/08 404/19 |
| 6,214,428 B1 * | 4/2001 | Henderson | ........... | B27M 3/0046 238/14 |
| 7,137,226 B2 * | 11/2006 | Fiutak | .................. | B27M 3/0053 52/223.7 |
| 7,735,272 B2 * | 6/2010 | Caroussos | ............. | E04B 1/2604 52/223.13 |
| 7,818,929 B2 * | 10/2010 | Fiutak | .................. | B27M 3/0053 52/177 |
| 7,883,294 B1 * | 2/2011 | Licina | .................... | B63B 35/34 114/263 |
| 8,549,792 B2 * | 10/2013 | Heselden | .................. | E04H 9/10 52/22 |
| 8,906,480 B2 * | 12/2014 | Fiutak | .................... | E01C 9/086 428/54 |
| 9,617,693 B1 * | 4/2017 | Penland, Jr. | ........... | B32B 15/095 |
| 9,670,639 B2 * | 6/2017 | Reeve | .................... | B29C 44/186 |
| 9,845,576 B2 * | 12/2017 | Penland, Jr | ........... | B32B 21/045 |
| 9,863,098 B2 * | 1/2018 | Penland, Jr | ........... | B32B 15/095 |
| 10,060,079 B2 * | 8/2018 | Wilson | .................... | E01C 9/086 |
| 10,273,638 B1 * | 4/2019 | Penland, Jr. | ........... | E01C 9/086 |
| 10,392,234 B2 * | 8/2019 | Bryan | .................... | B66C 23/78 |
| 2002/0122954 A1 * | 9/2002 | Dagher | ................... | B32B 21/08 428/537.1 |
| 2006/0265976 A1 * | 11/2006 | Fiutak | .................. | B27M 3/0053 52/177 |
| 2007/0056228 A1 * | 3/2007 | Penland, Sr. | ............ | E01C 5/14 52/177 |
| 2008/0292397 A1 * | 11/2008 | Farney | .................... | E01C 9/086 404/32 |
| 2012/0063844 A1 * | 3/2012 | Wold | ........................ | E01C 5/14 404/35 |
| 2013/0259568 A1 * | 10/2013 | Bouchard | .............. | B26D 3/005 404/35 |
| 2014/0154462 A1 * | 6/2014 | Fiutak | ..................... | E01C 9/086 428/119 |
| 2014/0341649 A1 * | 11/2014 | Bryan | ...................... | E04B 5/12 404/35 |
| 2016/0115652 A1 * | 4/2016 | Wold | ........................ | E01C 9/08 404/35 |
| 2016/0115653 A1 * | 4/2016 | Forbes | ..................... | E01C 5/14 404/35 |
| 2016/0177515 A1 * | 6/2016 | Penland, Jr | ........... | E01C 5/001 404/35 |
| 2016/0177530 A1 * | 6/2016 | Reeve | ..................... | B29C 44/186 248/634 |
| 2016/0222597 A1 * | 8/2016 | Penland, Jr. | ........... | E01C 9/086 |
| 2016/0355993 A1 * | 12/2016 | Tubbs | ..................... | B66C 23/78 |
| 2017/0089015 A1 * | 3/2017 | Penland, Jr. | .......... | B32B 15/095 |
| 2017/0121916 A1 * | 5/2017 | Penland, Jr | ........... | B32B 15/095 |
| 2017/0175341 A1 * | 6/2017 | Locotos | ................. | E01C 9/086 |
| 2017/0275829 A1 * | 9/2017 | Penland, Jr | ........... | B32B 21/045 |

\* cited by examiner

STRUCTURAL REINFORCED COMPOSITE CONSTRUCTION MAT

CROSS-REFERENCE TO RELATED APPLICATIONS

This application claims the benefit of U.S. Provisional Patent Application No. 62/581,254, filed Nov. 3, 2017, the contents of which are hereby incorporated by reference in their entirety.

BACKGROUND OF THE INVENTION

1. Technical Field

This invention relates generally to construction mats and particularly to construction mats made of composite materials.

2. Related Art

Construction mats are often utilized in gas and oil drilling and completion rig sites, as work platforms, wet job sites, as access roads in difficult terrain or environmentally sensitive environments, such as wet lands. The mats are typically made up of several heavy beams that are tied together by a series of metal rods. The beams are often made of timber (e.g., red oak or mixed hardwood) which is readily available and inexpensive, but has a tendency to become water logged and heavy and are prone to fungus and insect attack, rotting and deterioration, especially in extremely harsh, wet applications, greatly limiting their useful service life. The timber beams also lose their strength and integrity in wet conditions and can be quickly eroded under the load and abuse of heavy equipment propelled by caterpillar tracks. The tracks dig into the wood beams and gouge and shred the wood fiber, which is greatly magnified in wet operating conditions.

Mats made with composite beams (such as recycled plastics-based materials) are an alternative to wood mats and are less prone to wear and deterioration, especially in wet, harsh outdoor conditions, but may lack the beam strength of hardwood beams.

SUMMARY OF THE INVENTION

A composite construction mat constructed according to one preferred embodiment of the invention comprises a plurality of beams fabricated of plastics-based composite material and arranged side-by-side. The mat further includes a plurality of flitch plates that are arranged between at least some of the composite beams. The beams and flitch plates are tied together with a plurality of cross rods. The flitch plates are made of a material that is stiffer than that of the beams and is likewise moisture resistant to enhance the overall structural rigidity and beam strength beyond what the composite beams alone would provide.

The structural reinforced composite mat constructed accordingly has the advantage of being lighter, stronger and longer lasting than timber construction mats and it does not lose strength in prolonged wet conditions, nor does it absorb water, rot or otherwise deteriorate. The mat can be pre-engineered to the strength and load requirements of a particular job and will maintain its properties throughout its service life, unlike wood.

The structural reinforced composite mat constructed according to the invention is about 25% lighter than a mat of comparable beam size made of timber. This leads to a surprising and beneficial reduction in transportation costs and increased ease of handling on the job site. For example, a 12" thick timber mat for standard heavy construction, when dry, is about 40% heavier than a 7" structural reinforced composite mat made according to the invention. A structural reinforced composite mat made according to the invention surprisingly exceeds the load capacity of 12" timber mats. For example, a 12" thick dry use structural red oak mat (E=1,200,000 psi, Fb=1350, Fc perp=820 psi) performs very similar to a 7" structural reinforced composite mat made according to the invention with full soil support at a significantly lighter weight per foot. And this is a best case scenario for wood, as it assumes a dry, select red oak, with the expectation that the weight of the timber mat would greatly increase when used in a wet environment while its structural properties would greatly diminish due to moisture, decay and track erosion, none of which would be experienced by the structural reinforced mat which would maintain its properties irrespective of environment.

Another advantage of the structural reinforced composite mat is that the composite beams can be made from recycled plastics materials, unlike select timber beams which must be harvested from forests. The service life of the structural reinforced composite mat is estimated to be at least 5 times greater than an equivalent timber mat. And at the end of their useful life, structural reinforced composite mats can be recycled to make new mats.

Yet another advantage is that the structural reinforced composite mats are resistant to salt and most chemicals and do not absorb, retain or release chemicals or liquids as can often happen with timber mats. This can be particularly important when mats are to be reused in environmentally sensitive areas where environmental contamination is of concern. The structural reinforced composite mats can be repeatedly washed for reuse to remove any contaminants without any effect on the integrity of the mats.

BRIEF DESCRIPTION OF THE FIGURES

These and other features and advantages of the invention will be better understood when considered in connection with embodiments of the invention illustrated in the following figures and described in greater detail below.

DETAILED DESCRIPTION OF PREFERRED EMBODIMENTS

Figure 1:
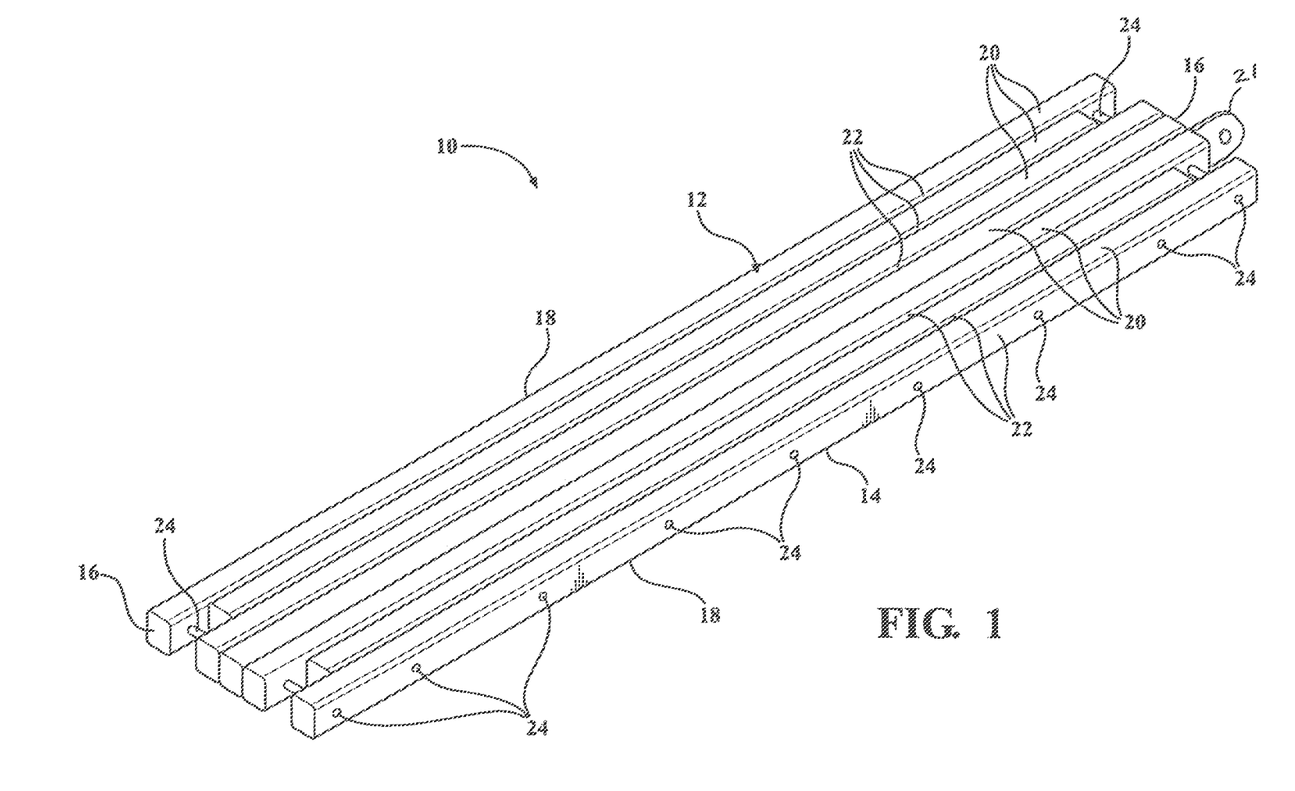
FIG. 1 is a perspective view of an embodiment of a structural reinforced composite mat made.

A structural reinforced composite mat constructed according to an embodiment of the invention is generally shown in perspective view in FIG. 1 and indicated by reference numeral 10.

The mat 10 has a top surface 12, a bottom surface 14, longitudinally opposite ends 16 and laterally opposite sides 18. The mat 10 has an overall length dimension Lmat extending between the two ends 16, an overall width dimension Wmat extending between the two sides 18, and an overall thickness Tmat dimension extending between the top 12 and bottom 14 surfaces. An exemplary mat 10 may have an overall Tmat×Wmat×Lmat measurement of 9 inches×51 inches×24 feet. All of these dimensions can vary depending upon the needs of a particular application. A mat according to an alternative embodiment (FIG. 4) may have overall dimensions of 7"×46"×20'.

Throughout the figures, it will be appreciated that dimensional references are exemplary in nature, and that the arrangements illustrated in the figures may be applied to mats having other dimensions.

The mat 10 includes a plurality of individual beams 20 and at least one and preferably a plurality of flitch plates 22.

The beams 20 each have a thickness dimension Tbeam, a width dimension Wbeam, and a length dimension Lbeam.

The beams are of a plastics (polymer) material, preferably a structural thermoplastic composite olefin polymer. One such material suitable for the beam 20 is a HDPE-based proprietary structural composite plastic beam material available from Axion Structural Innovations, of Zanesville, Ohio. Such plastics material comprises a blend of polypropylene and polyethylene, but predominately polyethylene with 5-50% glass fiber reinforcement, and more preferably 5-25% glass fiber reinforcement. Other HDPE based plastics materials may also be suitable depending upon the structural load requirements of a particular application, as well as plastics materials in general provided they are able to meet the load and strength and environmental requirements that a particular application may call for. It is thus to be understood that the invention contemplates the usage of a variety of plastics materials as the beam 20 material, particularly when coupled with the structural, load-enhancing flitch plates 22 to be explained in more detail below. The idea is that the composite plastics beam 20 and metallic flitch plates 22 work in synergy to collectively provide a lightweight, strong and water/chemical resistant mat suitably reinforced by the flitch plates 22 to yield the strength and rigidity required of a particular job application for which the mat 10 is to be used. The flitch plates 22 thus open up the possibilities for the types of candidate plastics materials beyond what may be otherwise suitable for mat application on their own without the flitch plates. For example, plastics materials that on their own may not possess the strength or rigidity required for use on their own as beams 20 of a construction mat 10 may well become suitable when paired with one or more flitch plates 22, such that the overall structure is able to meet the requirements of an application.

The dimensions of the individual beams 20 may vary depending upon the requirements of a particular application and the material used for the beams. For example, the beam 20 may have a thickness Tbeam×width Wbeam×length Lbeam of, respectively, 9 inches×7 inches×24 feet. As will be explained below, the beam 20 may be turned on edge such that the T×W×L dimensions are now 7"×9"×20' as in the embodiment of FIG. 4.

It will be appreciated that other cross-section dimensions may be used, such as square cross-sections, or cross-sections in which the thickness is twice as much as the width, or the width is twice as much as the thickness.

In one approach, the flitch plates 22 are fabricated of metal and preferably steel. The grade of steel may be ASTM A36. The flitch plates 22 each have a thickness dimension Tflitch, a width dimension Wflitch, and a length dimension Lflitch. For the 24 foot beam 20 above with a 9" thickness, the T, W and L dimensions of the flitch plates 22 are, for example, 8.5 inches×0.5 inches×288 inches. For the 7" beam thickness embodiment of FIG. 4, the thickness of the flitch plates 22 is reduced to 6.5", the width reduced to 0.25 inches, and the length reduced to 238 inches.

In another approach, the flitch plate material may be aluminum, galvanized steel, or pultruded fiberglass, with the latter also contemplating other non-metallic fiber-reinforced resinous plate structures, such as carbon fiber reinforced resin, for example. Wood and other materials that are prone to moisture absorption and decay that reduces the expected or entitled service life of the mat are not desirable as flitch plate materials, as are those that do not, when sandwiched between the composite beams, provide a strength and stiffening enhancement to the combined structure.

Figure 2:
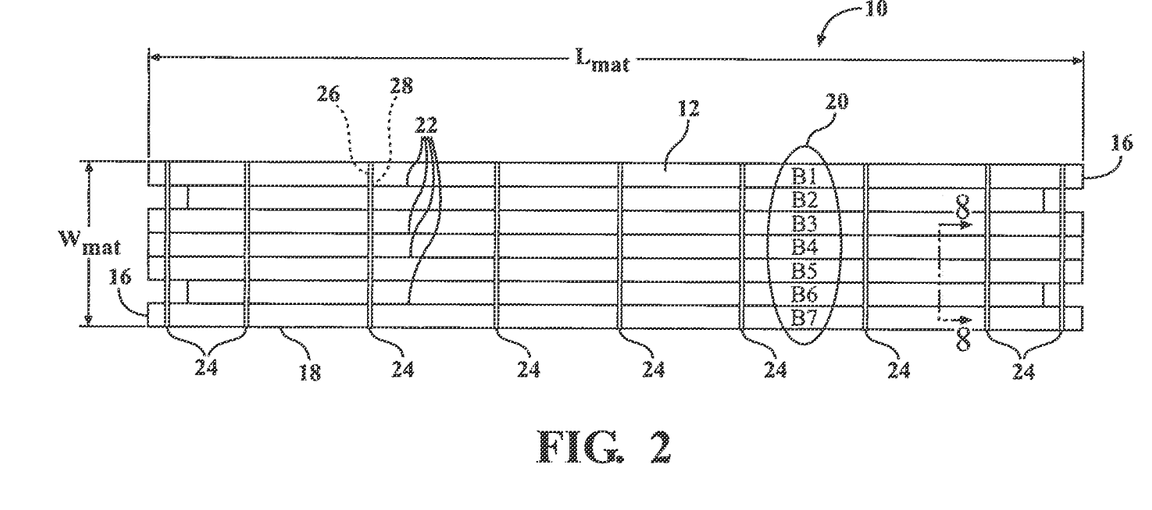
FIG. 2 is a top plan view of the mat of FIG. 1.
Figure 3:
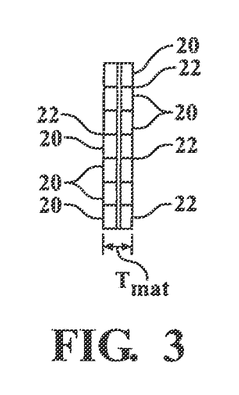
FIG. 3 is an end elevation view of the mat of FIG. 2.
Figure 4:
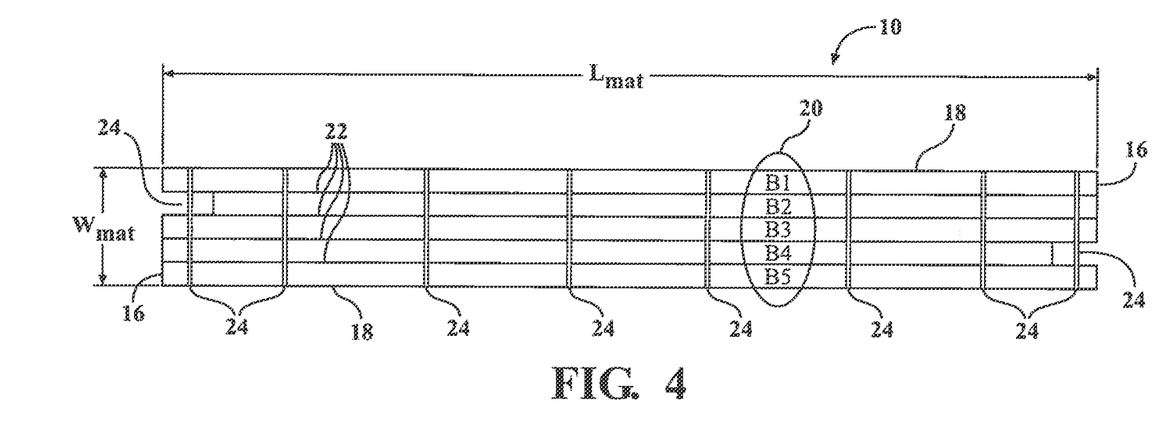
FIG. 4 is a top plan view of alternative mat.
Figure 5:
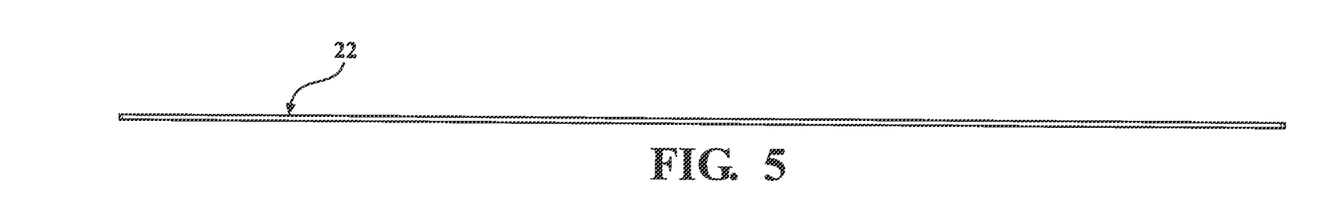
FIG. 5 is a fragmentary top plan view of a flitch plate.

As illustrated in FIGS. 1-4, the beams 20 and flitch plates 22 extend in the lengthwise direction of the mat 10. The beams 20 are arranged adjacent to one another such that there are two edge beams and one or more intermediate middle beams arranged side-by-side. In between at least some of the beams 20 are provided the flitch plates 22. There are preferably more beams 20 in number than there are flitch plates 22. In the illustrated embodiment of FIG. 2, there are a total of 7 beams 20 and 4 flitch plates. The beams may be identified individually as B1-B7, indicating their order. A flitch plate 22 is illustrated being provided between B1 and B2; B3 and B4; B4 and B5 and B6 and B7. In the embodiment of FIG. 4, the beams 20 of FIG. 2 are now turned on edge so that the 7" dimension is the thickness (height) and the 9" dimension is the width. In this embodiment, there are 5 beams 20 labeled B1-B5 and 4 flitch plates 22, with a flitch plate provided between each of the beams 20. The length is 20 feet. The overall width of the mat of the FIG. 4 embodiment is 46 inches. Everything else is the same.

It will be appreciated that other arrangements of the beams 20 and flitch plates 22 may be used. For example, the quantity of beams 20 may be increased, along with additional flitch plates to accommodate the additional beams. Alternatively, the same number of beams as in FIG. 2 may be used, but the beams 20 being turned on edge, similar to FIG. 4. The addition or deletion of beams 20 from an assembly, along with the orientation of the beams 20, can provide a variety of widths and thicknesses, even with a supply of beams having the same cross-section.

It will be seen by a comparison of the dimensions of both embodiments of FIGS. 2 and 4 that the flitch plates 22 are considerably narrower in width than that of the beams 20, and are slightly smaller in thickness (vertical height) and length than that of the beams 20. Preferably, at least the top edge of the flitch plates 22 is recessed below the top surface 12 of the beams 20 in the working area of the mat 10. Recessing the flitch plates 22 below the surface of the beams 20 serves to keep the flitch plates 22 out of direct contact with equipment moved or driven across the mat 10. For example, the metal caterpillar track used on bulldozers, excavators and heavy equipment that may be driven across the mat is kept out of contact with the recessed metal flitch plates 22, protecting each from unnecessary wear or damage. The recessing of the flitch plates 22 may also serve as a wear indicator of the beams 20, such that when the flitch plates 22 become exposed the users know it is time to replace the worn beams 20. And even if the flitch plates 22 do become exposed to the surface, the structural integrity of the mat 10 remains intact. It may be desirable to recess the flitch plates 22 from both the top 12 and bottom 14, especially if the mats 10 are to be reversible in nature such that both surfaces may be at times facing upward and directly engaged by the vehicles. Another reason to recess the flitch plates 22 from the bottom 14 as well is to keep the plates 22 from engaging the surface on which the mats 10 are supported, especially if there is concern of damage that may be caused by direct exposure to metal edges of the flitch plates 22. The invention does contemplate, however, that at least one or more portions of one or more flitch plates may project beyond a surface (top, bottom, end) of the adjacent beams 20 and may function, for example, as attachment, anchor, tie-down or strap points to lift or move the mat or secure during transport or to secure something to the mat. The projecting portion(s) may also function as an interlock that may cooperate with projecting features of an adjacent mat to link the mats together, such as by sliding a rod through aligned openings in the projecting portions. FIG. 1 illustrates, by way of example, projecting ear portion 21 of an associated flitch plate 22 that projects beyond the end of the beams 20 that may function for any of the purposes described above, or for another or no purpose.

As illustrated in FIGS. 2, 4, and 6-8 the beams 20 and flitch plates 22 are ganged together and secured by a plurality of rods or bolts 24 that extend cross-wise to the mat 10 between the opposite lateral sides 18. There are 8 such rods 24 shown in the example. The rods 24 serve to tightly clamp the side surfaces of the beams 20 and flitch plates 22 into engagement with one another, thereby actively binding them against lateral and longitudinal movement. The beams 20 and flitch plates 22 are provided with cross holes 26, 28 that are positioned and dimensioned to receive the rods 24. The rod 24 may be a 1 inch rod and the holes in the beams 20 may measure about 1.06 inches, and the rods 24 and may be a #7 Matlock® type bolt.

Figure 6:
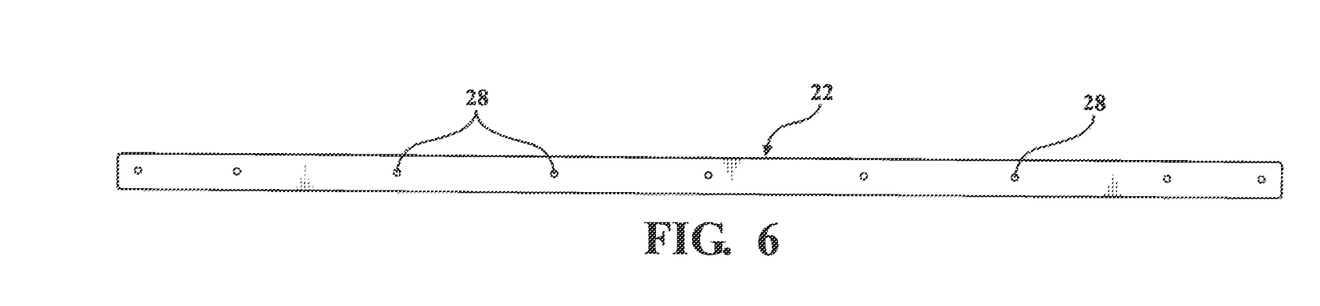
FIG. 6 is a fragmentary side view of the flitch plate.
Figure 7:
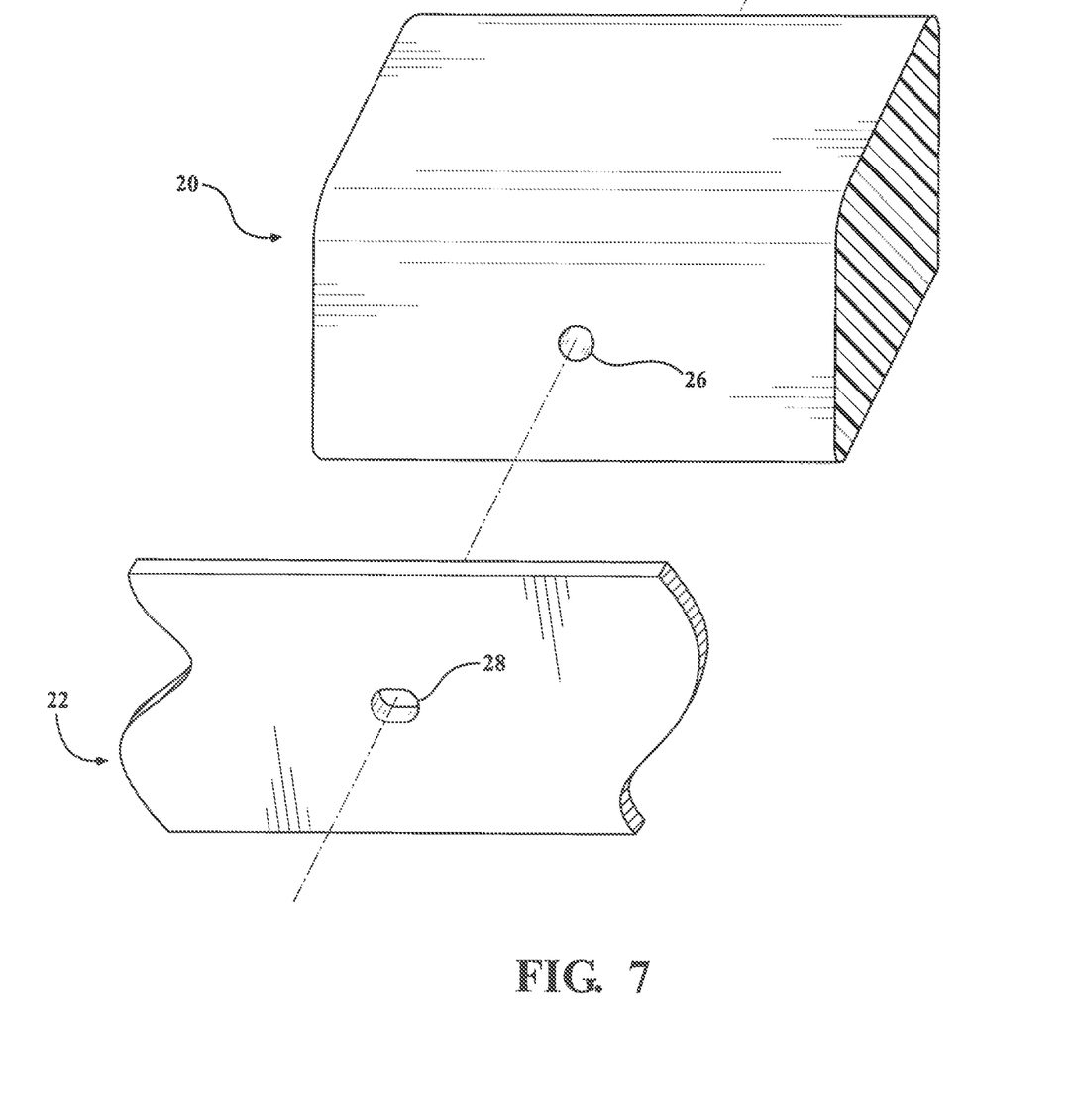
FIG. 7 is an exploded perspective view of the flitch plate and a beam.
Figure 8:
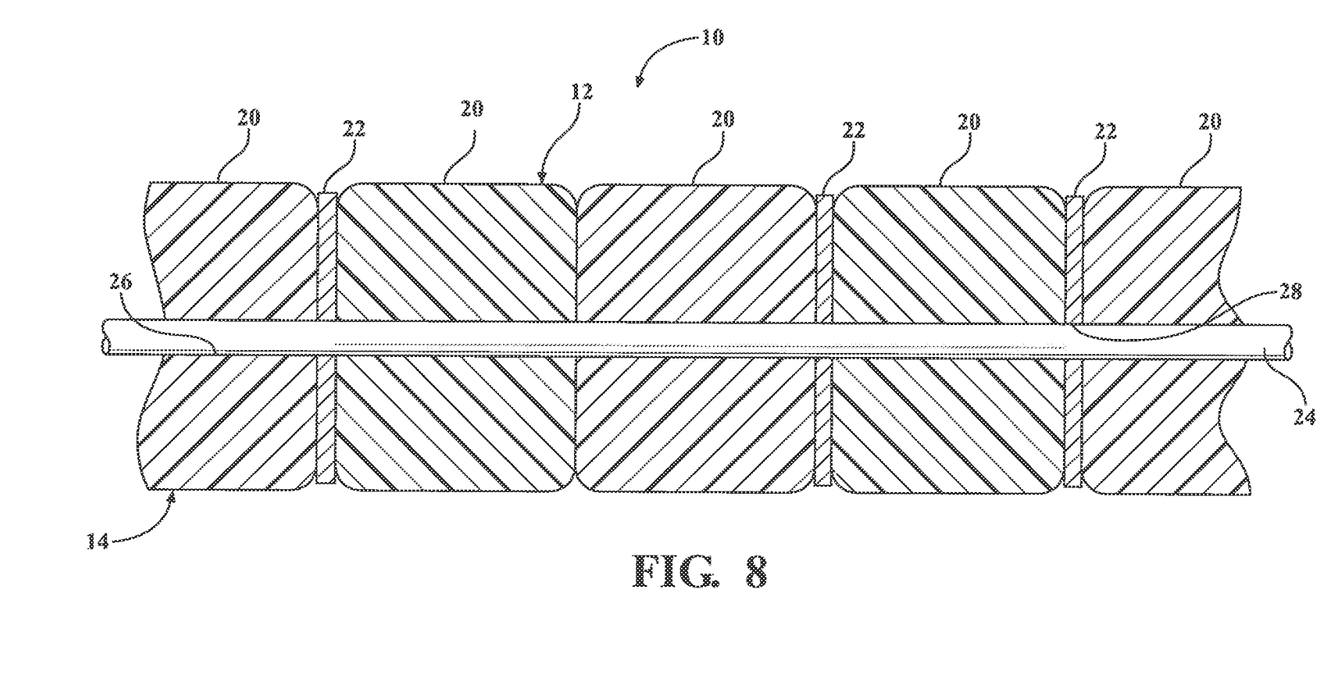
FIG. 8 is an enlarged fragmentary cross-sectional view taken along lines 8-8 of FIG. 2.

With reference to FIGS. 6 and 7, the holes 28 in the flitch plates 22 are aligned with the holes 26 of the beams 20. The holes 28 of the flitch plates 22 are preferably slotted in the lengthwise direction with rounded ends and a flat middle of the slot. The dimensions of the slotted holes 28 may be, for example, 1.06" in height (i.e., the same as the height dimension of the holes 26 of the beams 20), and a length of 1.5". The extension of the holes 28 in the lengthwise direction of the flitch plates 22 is designed to accommodate the different coefficients of expansion of the plastic beams 20 and the metal flitch plates 22, which may cause the beams 20 to expand disproportionately to that of the flitch plates 22, particularly in the lengthwise direction where the extension of the materials are the greatest. The slots thus allow the beams 20 to shift, as necessary, in the lengthwise direction due to slight lengthening/retracting of the beams 20 relative to the flitch plates 22 with temperature changes so as not to cause binding and potential warpage of the beams 20 and flitch plates 22. Because of the relatively small cross section in the thickness (height) dimensions between top and bottom surfaces, the degree of lengthening/retraction is insignificant and so the height dimension of the slots 28 in the flitch plates can be the same as that of the holes 26 in the beams 20, such that their relative positions in the vertical direction never change with temperature.

The beams 20 may all be the same or there may be one or more beams that is shorter, as illustrated in FIGS. 2 and 4. The shorter beam(s) 20 may expose a section of one or more of the rods 24 and provide an anchor site for lifting and handling the mat 10 with a chain, hook, or the like.

Figure 9:
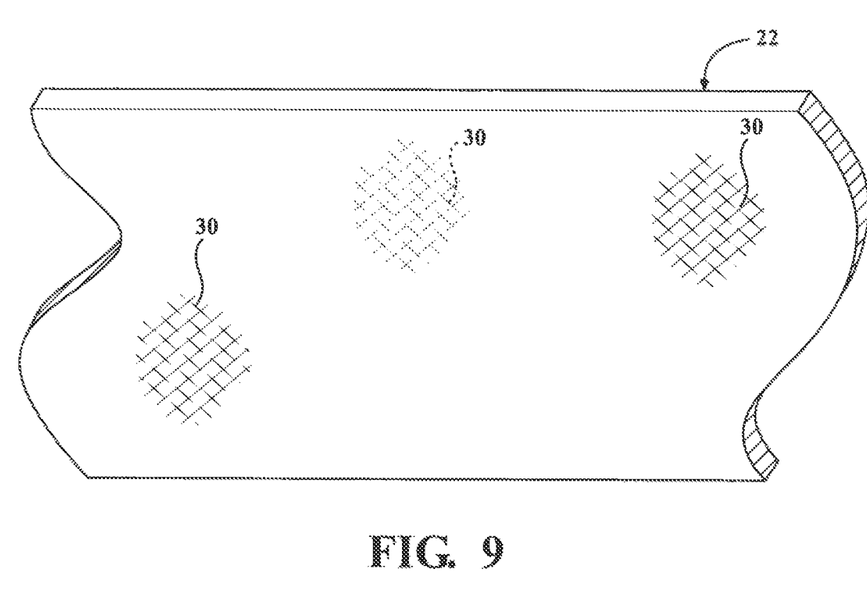
FIG. 9 is a fragmentary perspective view of a flitch plate according to an alternative embodiment of the invention.

The flitch plates 22 may be fabricated from steel plate stock of suitable dimensions, examples which were provided above, or from aluminum, galvanized steel, or pultruded fiberglass. The flitch plates 22 may have smooth sides or may, alternatively, have grip-enhancing features, such as knurling, ridges, spikes, protrusions or other textured features that increase the sliding friction when mated with the beams 30, along some or all of the side surfaces as illustrated in FIG. 9. The texturing may be on one or several or all of the flitch plates 22 that are used in the mat 10. The texturing acts as a passive load transfer mechanism, wherein loading on the surface of the beams 20 is transferred in part to the flitch plates 22 through the gripping, friction action of the texturing. The bolts or rods 24 serve as active load transferring features wherein the load applied to the beams 20 is born by the bolts 24 which are also supported by and transfer load to the flitch plates 22.

Figure 10:
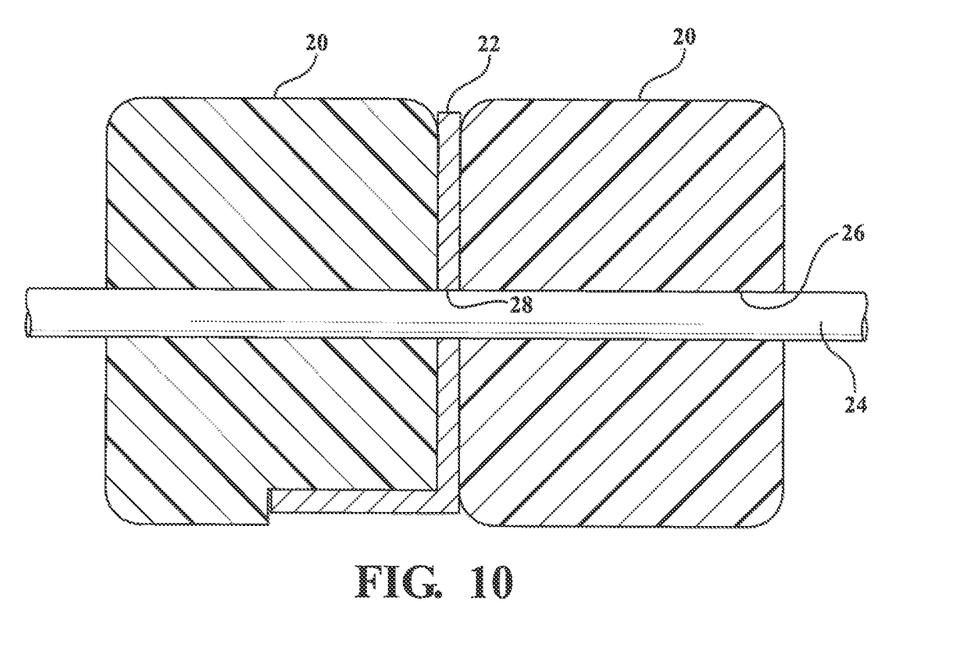
FIG. 10 is an enlarged fragmentary cross-sectional view of another alternative embodiment.
Figure 11:
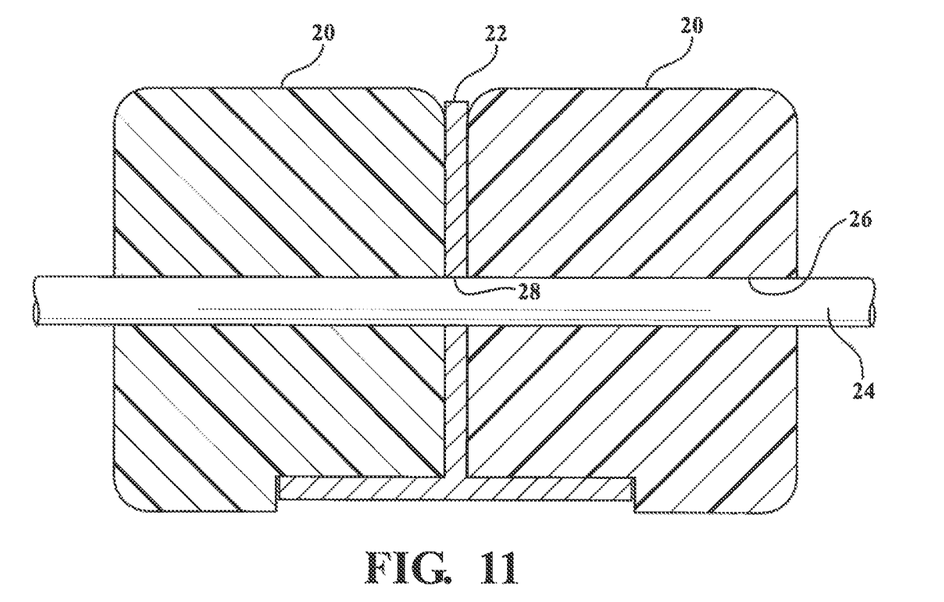
FIG. 11 is an enlarged fragmentary cross-sectional view of still another alternative embodiment.

FIGS. 10 and 11 illustrate further alternative embodiments of the flitch plates 22, wherein the FIG. 10 embodiment provides an L-shaped cross section for the flitch plate 22 and FIG. 11 provides a T-shaped cross section. The short legs of the L and T are designed to engage a corresponding load-bearing surface of the beam(s) and further provide load-transferring support to the beams 20. The short legs can all be arranged on one side (bottom of mat) or be staggered to the top and bottom sides of the mat 10, and are preferably recessed below the outer surface(s) of the beams 20. FIGS. 10 and 11 illustrates the short legs of the L or T as being on the bottom of the mat 10.

Figure 12:
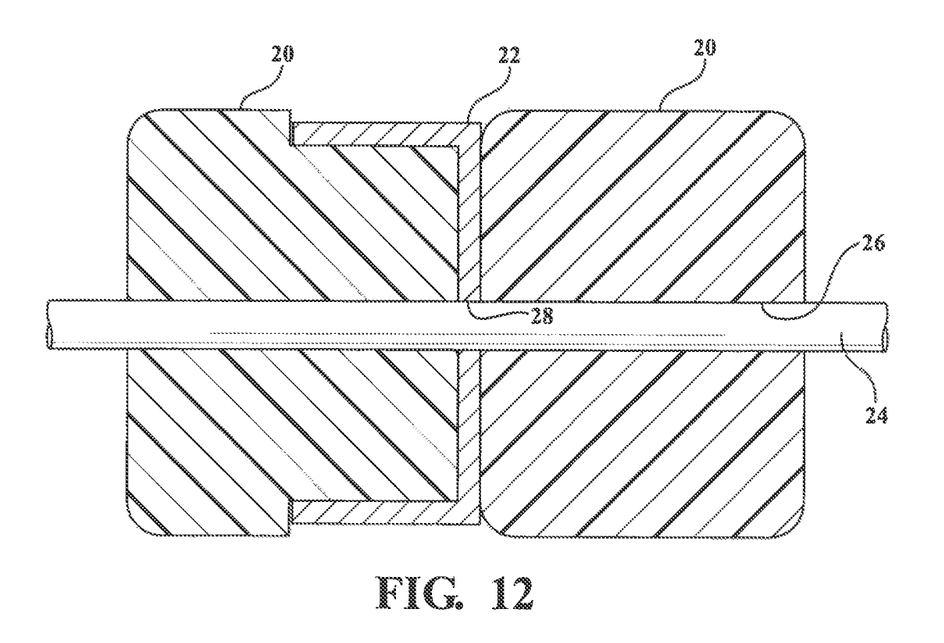
FIG. 12 is an enlarged fragmentary cross-sectional view of still another alternative embodiment.
Figure 13:
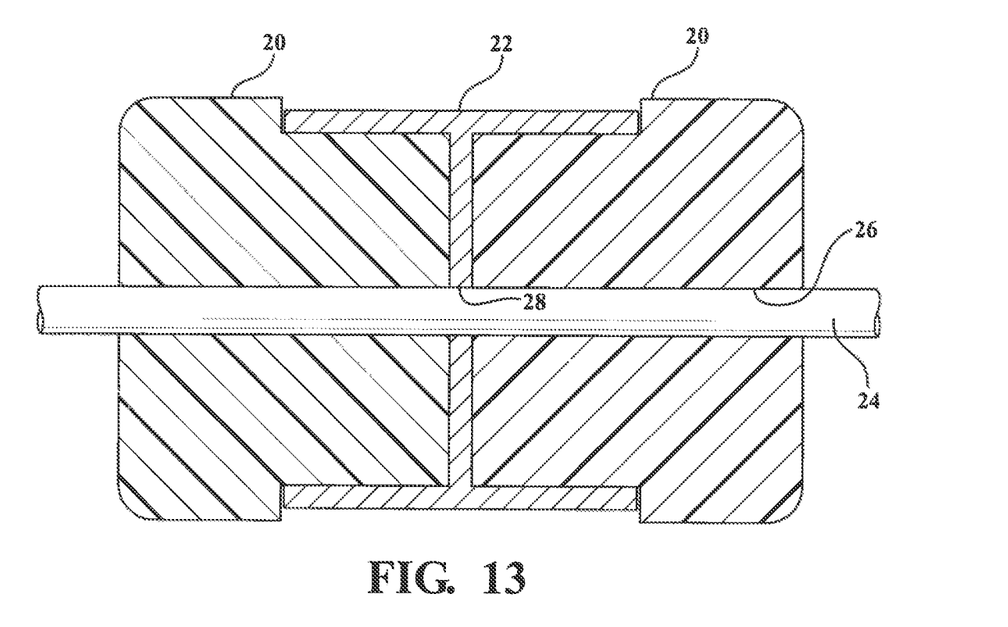
FIG. 13 is an enlarged fragmentary cross-sectional view of still another alternative embodiment.

FIGS. 12-13 illustrates further alternative embodiments of the flitch plates 22, similar to the alternatives of FIGS. 10 and 11.

The FIG. 12 embodiment provides a C-shaped cross section for the flitch plate 22. The short legs of the C are designed to engage a corresponding load-bearing surface of the beam(s) and further provide load-transferring support to the beams 20. The short legs can be arranged on both the top and bottom of the mat, and are preferably recessed below the outer surface(s) of the beams 20.

The FIG. 13 embodiment provides an I-shaped cross section (similar to a traditional I-beam) for the flitch plate 22. The short legs of the I-shape are designed to engage a corresponding load-bearing surface of the beam(s) and further provide load-transferring support to the beams 20. The short legs can be arranged on both the top and bottom of the mat, and are preferably recessed below the outer surface(s) of the beams 20.

Figure 14:
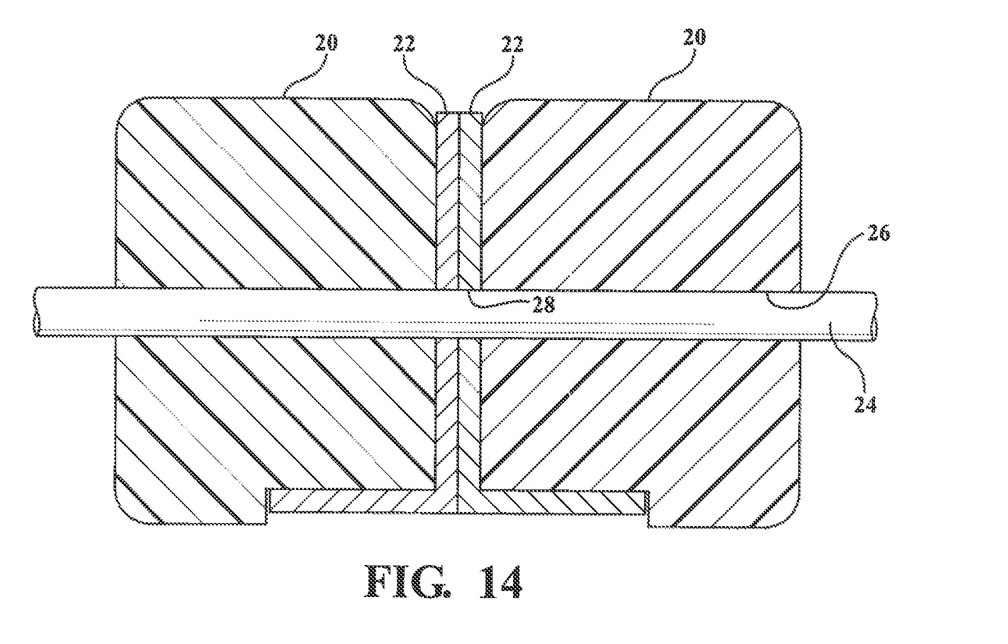
FIG. 14 is an enlarged fragmentary cross-sectional view of still another alternative embodiment.
Figure 15:
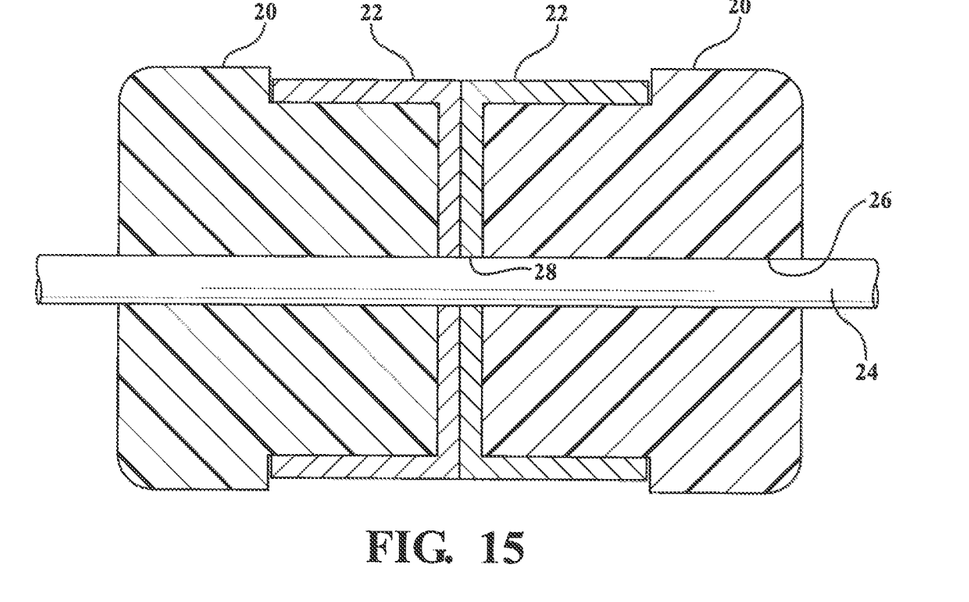
FIG. 15 is an enlarged fragmentary cross-sectional view of still another alternative embodiment.

As shown in FIGS. 14 and 15, multiple flitch plates 22 may be disposed between two of the beams 20, to create shapes similar to the T or I-shaped cross-sections. The FIG. 14 embodiment utilizes two L-shaped flitch plates 22 to create a T-shape. The short legs of the Ls and the resulting T are designed to engage a corresponding load-bearing surface of the beam(s) and further provide load-transferring support to the beams 20. The short legs can all be arranged on one side (bottom of mat) or be staggered to the top and bottom sides of the mat 10, and are preferably recessed below the outer surface(s) of the beams 20.

The FIG. 15 embodiment utilizes two C shaped flitch plates 2 to create an I-shape. The short legs of the Cs that create the I-shape are designed to engage a corresponding load-bearing surface of the beam(s) and further provide load-transferring support to the beams 20. The short legs can be arranged on both the top and bottom of the mat, and are preferably recessed below the outer surface(s) of the beams 20.

Figure 16:
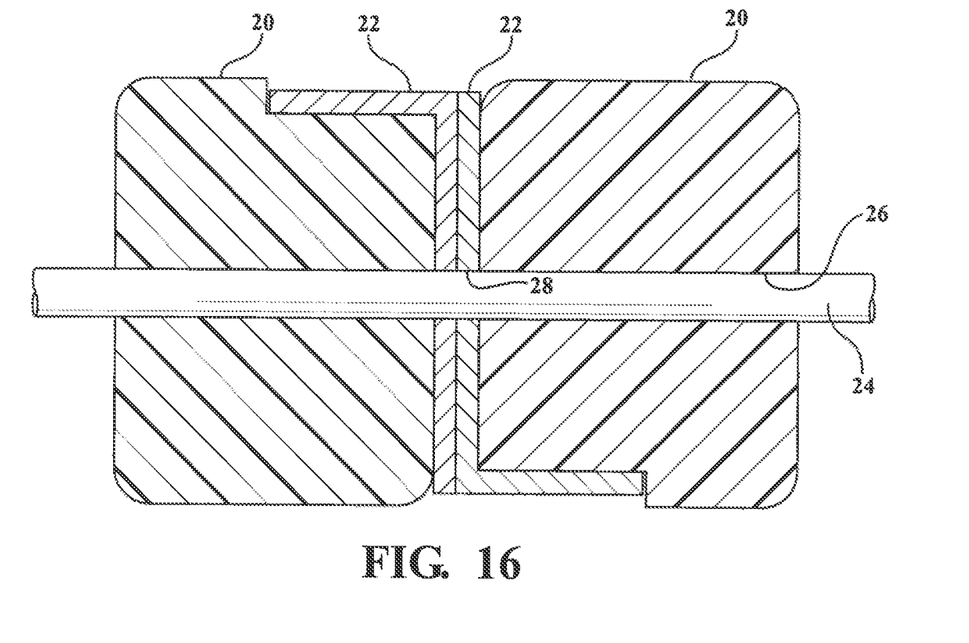
FIG. 16 is an enlarged fragmentary cross-sectional view of still another alternative embodiment.

FIG. 16 illustrates another embodiment of combined flitch plates, in which two L-shapes are combined to create a Z-shape. The short legs of the Ls that create the Z-shape are designed to engage a corresponding load-bearing surface of the beam(s) and further provide load-transferring support to the beams 20. The short legs can be arranged on both the top and bottom of the mat, and are preferably recessed below the outer surface(s) of the beams 20.

Figure 17:
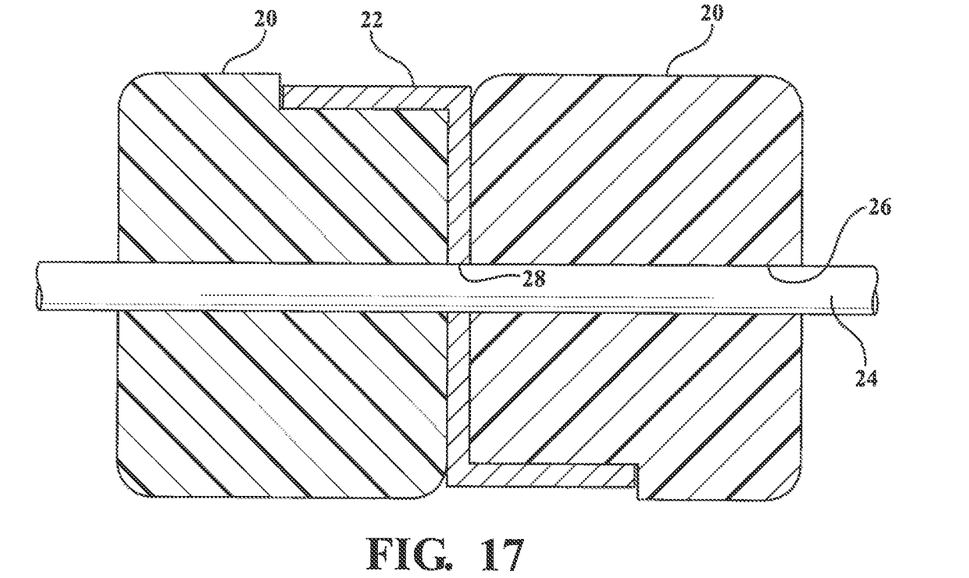
FIG. 17 is an enlarged fragmentary cross-sectional view of still another alternative embodiment.

FIG. 17 illustrates another embodiment of the flitch plate, and provides a Z-shaped cross section (similar to the two Ls) for the flitch plate 22. The short legs of the Z-shape are designed to engage a corresponding load-bearing surface of the beam(s) and further provide load-transferring support to the beams 20. The short legs can be arranged on both the top and bottom of the mat, and are preferably recessed below the outer surface(s) of the beams 20.

Figure 18:
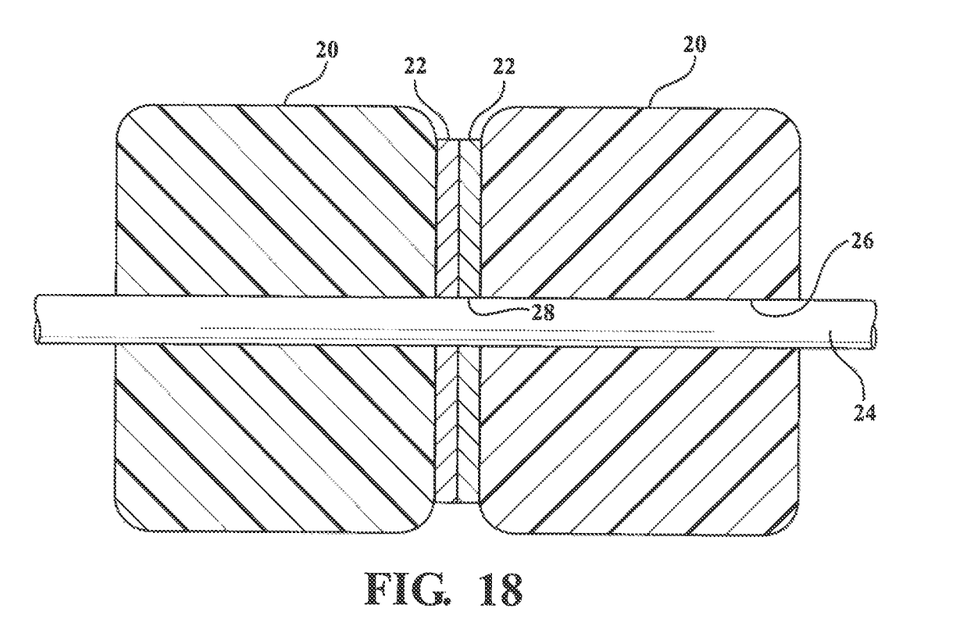
FIG. 18 is an enlarged fragmentary cross-sectional view of still another alternative embodiment.

FIG. 18 illustrates two flat flitch plates 20 that may be combined to create an increased thickness flitch plate.

In each of the above described alternatives, the previously described features of the flitch plates 22 will also apply to the alternatives, such as the slots 28 and the surface feature 30.

A product comparison of exemplary mats and their physical properties are as follows:

| Product Comparison | Weight (lbs) | $F_c$ Perp Compression Perp. Grain | E Elastic Modulus (psi) | $F_b$ Allowable Stress (psi) | E*I (kip*in$^2$) Full Section Timbers |
|---|---|---|---|---|---|
| 12" × 4" × 20' & 24' Select Red Oak[1] | 20' - 4,000 24' - 4,800 | 550 | 1,100,000 | 1,150 | 7,600,000 |
| 12" × 4 × 20' & 24' No. 2 Beech-Birch-Hickory[1] | 20' - 4,000 24' - 4,800 | 480 | 1,100,000 | 765 | 7,600,000 |
| 7" × 46" × 20' Embodiment | 2,700 | 4,500[2] | Mixed[3] | 3,000 | 4,500,000[4] |
| 9" × 51" × 24' Embodiment | 4,820 | 6,000[2] | Mixed[3] | 4,500 | 8,000,000[4] |

1. Hardwood Lumber Information Source—American Wood Council NDS Supplement 2015 Edition for 5"×5" and larger timbers, Wet use adjustment factors applied—Fb of 0.85, Fc Perp of 0.67, E of 0.9. Weight and performance varies with moisture content and rate of deterioration.
2. Design values calculated for beams only. Flitch plates are isotropic and have no grain. Figures shown assuming standard load distribution between beams (Perp Compression=1,200 psi, Allowable Stress=1,100 psi) and steel plates.
3. Composite materials using both beams (E=350,000) and steel flitch plates (E=29,000,000 psi)
4. Calculated E values based on composite action between beams, flitch plates and rods.

It will be seen from the above comparative date that the structural property advantages of a mat constructed according to the invention versus the conventional 12" red oak or mixed hardwood mat is notable and significant. For example, mats 10 using a 7" thickness beams (embodiment of FIG. 4) performed similarly to the much thicker 12" timber mats with full soil support with a comparable 25% reduction in weight. The 9" mat (FIG. 2) exceeded the 12" timber mat capacity in all applications. It is noted that a 12" standard timber mat, when dry, is about 40% heavier than a comparable 7" mat fabricated according to the invention. Below is a comparison of the soil bearing capacity of the 7" mat and the standard 12" timber mat:

| | | Width of Tire of Track on Mat | | | | | | |
|---|---|---|---|---|---|---|---|---|
| Mat | Load (lb) | 6" | 12" | 18" | 14" | | | |
| 7" Embodiment | 100,000 | 2100 | 2000 | 1750 | 1600 | 1400 | 1200 | 1100 |
| | 140,000 | 3700 | 3400 | 3000 | 2650 | 2500 | 2350 | 2200 |
| | 200,000 | 5800 | 5600 | 5400 | 5200 | 5100 | 4900 | 4800 |
| 12" Oak Mat | 100,000 | 2250 | 2100 | 1950 | 1850 | 1750 | 1650 | 1500 |
| | 140,000 | 4200 | 3800 | 3500 | 3300 | 3000 | 2800 | 2500 |
| | 200,000 | 7700 | 7100 | 6500 | 5800 | 5300 | 4900 | 4400 |

As can be seen a 12" thick dry select structural oak mat performs very similarly to a 7" thick structural reinforced composite mat 10 according to the invention with full soil support at a significant lighter weight per foot. The above numbers for oak would diminish greatly once the mat becomes wet, absorbs water and advances toward decay. The wood charts above assume a 12% moisture content of the oak (i.e., dry conditions). If the lumber used for the mat is green or used for a prolonged period of time in a saturated environment, the boards will either absorb moisture, lose allowable stress ($F_b$) as well as stiffness (E) by as much as 67% from the maximum values. This does not happen with the mats 10 constructed according to the invention.

Sometimes preservatives such as creosote, chromated copper arsenate (CCA), ammoniacal copper zinc arsenate (ACZA) and ammoniacal copper arsenate (ACA) are used to treat wood timbers to protect against rot, and these materials may leach out of the lumber and into the environment. This does not happen with the mats 10 made in accordance with the invention since they are not prone to moisture attack and do not require any chemical treatment. The mats 10 according to the invention remain inert and unchanged by the environment they occupy.

A method of constructing or repairing a mat 10 is also provided and includes the steps of arranging a plurality of elongate plastic beams in side-by-side order, arranging a metallic flitch plate between at least one adjacent pair of beams; fastening the beams and at least one flitch plate together in a crosswise direction at a plurality of locations along a length of the mat; and wherein the at least one flitch plate is at least partially recessed below an outer surface of the beams between which it is arranged.

It is to be understood that the above drawings and description is exemplary of the construction and practice of embodiments of the invention and is not limiting of the invention. Rather, the invention is defined in the appended claims which follow.

What is claimed is:

1. A mat assembly for use in construction, comprising:
    a plurality of structural beams fabricated of composite plastics material and disposed in side-by-side arrangement;
    a plurality of flitch plates disposed between at least some of adjacent pairs of the structural plastic beams;
    a plurality of fasteners extending crosswise to the structural beams and flitch plates to secure them tightly together, and wherein the flitch plates increase the strength and stiffness of the mat assembly.

2. The assembly of claim 1, wherein the flitch plates are fabricated of metal.

3. The assembly of claim 2, wherein the metallic flitch plates are steel.

4. The assembly of claim 1, wherein the flitch plates are fabricated of fiber-reinforced resin.

5. The assembly of claim 4 wherein the flitch plates are glass fiber reinforced resin.

6. The assembly of claim 1 wherein there are fewer flitch plates than there are beams.

7. The assembly of claim 6 wherein there are at least 5 of the beams and at least 4 of the flitch plates.

8. The assembly of claim 7 wherein the beams and the flitch plates have cross holes in which are aligned and in which the fasteners are received.

9. The assembly of claim 8 wherein the cross holes of the flitch plates are elongated in a lengthwise direction of the mat.

10. The assembly of claim 1 wherein the flitch plates have a length, a width and a thickness, and wherein the flitch plates extend longitudinally of the beams in the length direction, extend vertically of the beams in the width and extend laterally of the beams in the thickness direction, and wherein the length is greater than the width is greater than the thickness of the flitch plates.

11. The assembly of claim 1 wherein the mat has a top surface defined by a top surface of the beams, and at least a majority of an associated top surface of the flitch plates are recessed below the top surface of the mat.

12. The assembly of claim 11 wherein the mat further has a bottom surface defined by a bottom surface of the beams and at least a majority of an associated bottom surface of the flitch plates are recessed above the bottom surface.

13. The assembly of claim 1 wherein at least one of the flitch plates has a projecting feature that extends beyond a top, bottom and/or end surface of the mat.

14. The assembly of claim 1 wherein the flitch plates have opposite side faces, and wherein at least a portion of at least one of the side faces of at least one of the flitch plates is provided with grip-enhancing features that frictionally engage corresponding side faces of the beams with which they are in contact to enhance the gripping action of the flitch plates with the beams for increased sliding friction effect beyond what would be provided without the gripping features.

15. The assembly of claim 14 wherein the grip-enhancing features are provided on both sides of all of the flitch plates.

16. The assembly of claim 15 wherein the fasteners force the grip-enhancing features into contact with the beams.

17. The assembly of claim 1 wherein at least one of the flitch plates has an L-shaped cross section and the small leg of the L engages a corresponding surface of the associated beam.

18. The assembly of claim 1 wherein at least one of the flitch plates has a T-shaped cross section and wherein the small legs of the T engage corresponding surfaces of adjacent beams.

19. The assembly of claim 1 wherein the plastic beam is made of HDPE-based material.

20. The assembly of claim 1 wherein at least two of the beams are in direct side-to-side engagement with one another without the interposition of a flitch plate.

21. The assembly of claim 20 wherein there are 7 beams and 5 flitch plates.

22. The assembly of claim 1 wherein at least one flitch plate has a cross-sectional shape that is either L-shaped or T-shaped and wherein the small leg of the L or T shape engages at least one adjacent beam and further wherein the small leg is recessed inward of an outer surface of the at least one beam that it engages.

23. A mat assembly, comprising:
    a plurality of structural beams fabricated of a blend of polypropylene and polyethylene, but predominately polyethylene composite plastics material with 5-50% glass fiber reinforcement disposed in side-by-side arrangement;
    a plurality of flitch plates disposed between at least some of adjacent pairs of the structural plastic beams and fabricated of at least one of steel and glass fiber reinforced resin;
    a plurality of fasteners extending crosswise to the structural beams and flitch plates to secure them tightly together, and wherein the flitch plates increase the strength and stiffness of the mat assembly in relation to an assembly of the beams without the flitch plates.

* * * * *